United States Patent [19]

Albert et al.

[11] 4,026,158

[45] May 31, 1977

[54] TEMPERATURE COMPENSATION FOR A DAMPED FLUID PROOF MASS ACCELEROMETER

[75] Inventors: William Charles Albert, Boonton; Bart Joseph Zoltan, Old Tappan, both of N.J.

[73] Assignee: The Singer Company, Little Falls, N.J.

[22] Filed: Feb. 24, 1976

[21] Appl. No.: 660,825

[52] U.S. Cl. .............................................. 73/497
[51] Int. Cl.² ..................... G01P 3/26; G01P 7/00
[58] Field of Search ............ 73/497, 503, 515, 516, 73/522; 200/61.45

[56] References Cited

UNITED STATES PATENTS

| 3,239,620 | 3/1966 | Albert | 200/61.45 R |
| 3,481,204 | 12/1969 | Albert | 73/497 |
| 3,771,368 | 11/1973 | Albert | 73/503 |

*Primary Examiner*—James J. Gill
*Assistant Examiner*—Anthony V. Ciarlante
*Attorney, Agent, or Firm*—Thomas W. Kennedy

[57] ABSTRACT

In an accelerometer in which a proof mass is disposed in a damping fluid and acts against said fluid through a flow path controlled by the groove length of a helix disposed on a bellows, a low resistance flow path is provided connecting the areas above and below the helix to prevent movement of the proof mass due to fluid displacement caused by rapid temperature changes.

6 Claims, 1 Drawing Figure

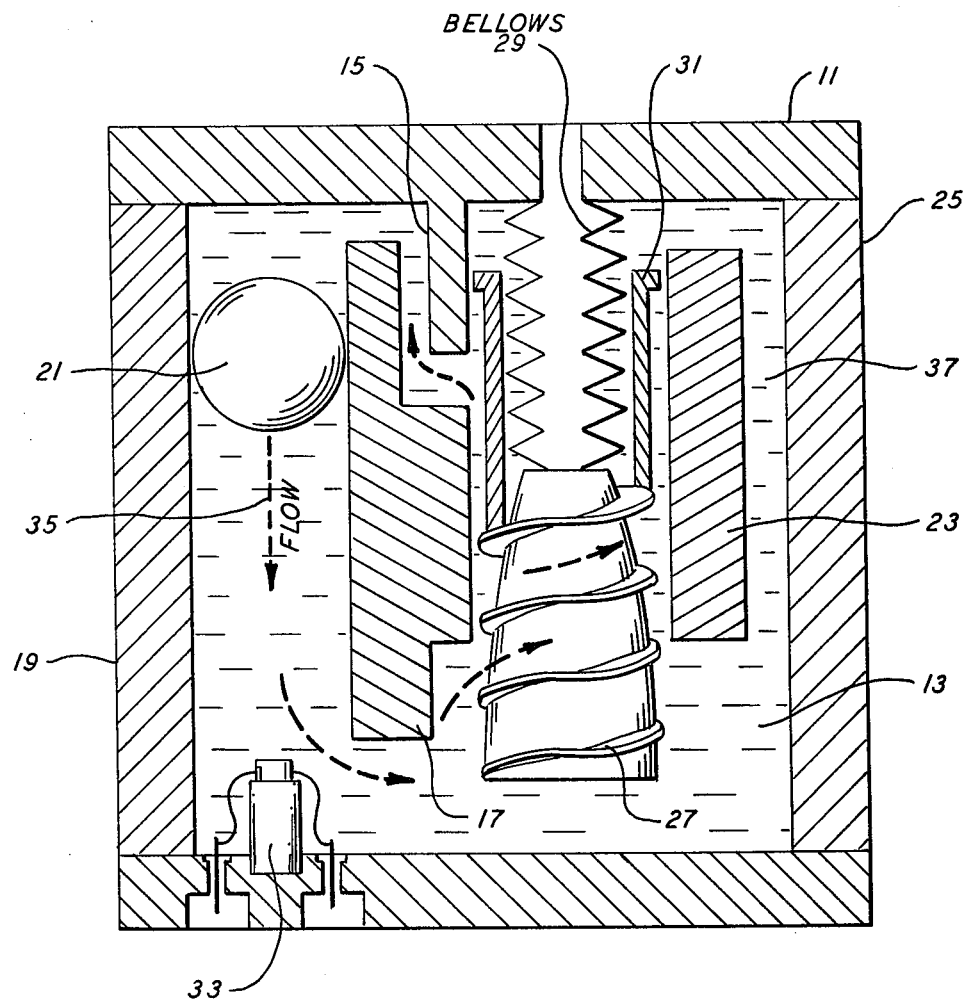

TEMPERATURE COMPENSATION FOR A DAMPED FLUID PROOF MASS ACCELEROMETER

The invention herein described was made in the course of or under a contract or subcontract thereunder, (or grant) with The United States Air Force.

BACKGROUND OF THE INVENTION

This invention relates to accelerometers in general and more particularly to an improved temperature compensation mechanism for a accelerometer utilizing proof masses disposed in a damping fluid.

In U.S. Pat. No. 3,239,620 a fluid damped velocity switch is disclosed. This arrangement includes an outer body with a cavity containing damping fluid, and an inner body disposed in the cavity and moveable relative thereto forming at least one variable volume chamber therein and damping means connecting to the chamber controlling flow therethrough. Disclosed in connection with this velocity switch is a helix and bellows arrangement used for temperature compensation; fluid is caused to flow through a variable groove length in the helix depending on the fluid velocity, which varies with temperature, under the control of the bellows.

A similar arrangement is used for temperature compensation in a multiple output intergating acceleromator disclosed in U.S. Pat. No. 3,771,368. In that patent, a plurality of proof masses which are adapted to move relative to a casing in response to acceleration of the casing are disposed in a damping fluid. The proof masses are of different mass or size so that they respond differently to forces on the device resulting from acceleration. Output signals are generated in response to predetermined movement of each of the proof masses. The principles on which this device operate are similar to those of U.S. Pat. No. 3,239,260. Once again, a helix and bellows arrangement is used for temperature compensation. A further device of this nature is disclosed in co-pending application Ser. No. 591,433 filed June 30, 1975 and assigned to the same assignee as the present invention. It too relies on a bellows and helix arrangement for temperature compensation.

Although the temperature compensation provided by such an arrangement works quite well during normal temperature changes problems can occur if sudden temperature changes occur during operation. since such accelerometers are in missiles and the like it is most likely that such a temperature transient during operation would be caused by the radiation of a nearby nuclear event. Should the accelerometer of U.S. Pat. No. 3,771,368 be subjected to such rapid and intense heating it has been calculated that inaccuracies will occur.

The purpose of the bellows is in these devices is to reposition the helix as the fluid temperature, and thus the fluid volume changes. The helix is designed to present the correct resistance to flow such that the instrument scale factor remains constant with temperature. Under normal circumstances, the bellows and helix perform this function as desired. However, what will take place during a rapid heating such as will occur during a nuclear event must be considered. The fluid increases in temperature, expands and displaces the bellows upward. As the bellows moves upward the helix moves along with it. The helix displaces fluid which is blocking its motion. The fluid is constrained to move from an area above the helix through the bore containing the proof mass. Since a positive displacement of the fluid takes place, the ball or proof mass which is in the way of the fluid motion is displaced in the bore. With the arrangement shown in the previous patents, an upward movement of the bellows will result in a downward movement of one or more of the proof masses. To the instrument this is the same as seeing a certain number of G seconds when in fact it has not. Were the instrument to experience a sudden decrease in temperature while intergating, the bellows would expand and the ball would travel upward. If the instrument experienced a temperature change, but then return to its initial temperature before the intergration cycle is completed, the net bellows motion would be zero and no instrument error would result. However, such can not be depended upon.

Thus, it can be seen that there is a need for an improved temperature compensation mechanism to take care of sudden temperature changes.

SUMMARY OF THE INVENTION

The present invention avoids this problem in the prior art apparatus by providing a new, low resistance flow path which permits the fluid above the helix, and around the bellows to be displaced and flow through a low resistance path to the space below the helix. Between the space above the helix and the normal flow path which includes the proof mass separators are provided. Thus, although the fluid could flow through the other path and affect the proof mass, the resistance of this path is so high that it is extremely unlikely that such will occur. As a result, the problem of positively displacing fluid containing the proof mass is no longer a problem in the structure of the present invention.

BRIEF DESCRIPTION OF THE DRAWINGS

FIG. 1 is a cross-sectional schematic view of an accelerometer having the improved temperature compensation means of the present invention installed.

DETAILED DESCRIPTION OF THE REFERRED EMBODIMENT

The single figure illustrates the improvement of the present invention. Although the figure shows a single proof mass, it will be recognized that the same arrangement is equally applicable to a device such as that disclosed in U.S. Pat. No. 3,771,368 where more than one proof mass is used. Shown is a casing 11 filled with a damping fluid 13. Within the casing are a number of dividers. A dividing wall 15 extends a short distance down from the top of the casing 11. Adjacent thereto is additional dividing wall 17 which, along with the side wall 19 form a space in which the proof mass 21 is disposed. Another dividing wall 23 is disposed on the other side of the instrument forming, with the other side wall 25 a low resistance flow path. Between the walls 15 and 17 and the wall 23 is disposed the helix and bellows arrangement which includes a helix 27 disposed on the end of a bellows 29. Extending from the top of the helix 27 is a cylindrical separator 31. Also shown is a switch 33 which operates when the proof mass 21 extends to close its contacts.

The normal operation of a device of this nature is described in detail in the aforementioned patents. Basically, under normal operation a given level of acceleration over a sufficient period of time will cause the ball 21 to be driven down against the resistance of the damping fluid 13 which follows the normal flow path 35 shown in dotted lines. At the point when the ball reaches the switch 33 and closes it, a known number of G seconds will have occurred. This permits, for example, an action to be taken in the missile after it has changed velocity by a present level. As noted above, the purpose of the bellows and helix arrangement is temperature compensation. During normal operation the bellows will move up and down moving the helix therewith to shorten and lengthen the flow path through the helix to thereby change the flow resistance with temperature change. This in turn causes a constant resistance to be present irregardless of temperature change. Normally, minor and slow temperature changes are expected. Thus, in the prior art apparatus separator 31 an extra dividing wall 23 along with the low resistance flow path 37 between the dividing wall and casing are not present. If fluid is displaced above the bellows it will travel through the normal flow path but, because of the small changes will have little affect on proof mass.

However, without the additional features of the present invention should a nuclear event occur and cause extreme heating, a fast contraction of the bellows could take place forcing the fluid above the helix through the normal flow path 35 and tending to push the proof mass 21 downward to give a false G second indication. The use of the dividing wall 23 forming the low resistance flow path 37 along with the separator 31 avoids this problem. Should a nuclear event or the like occur, and the bellow expands, the fluid above the helix will forced through the low resistance flow path from above the helix to below the helix. The resistance through the normal path which would require the fluid to come around the separator and through the gap between the separator and the wall 15 and then around that wall to the area above the proof mass is of a high resistance and it is unlikely that any appreciable amount of the fluid will follow that path. Similarly, if the bellows moves the helix downward, the fluid will tend to follow the low resistance path to a point above the helix. In this manner, rapid and extreme temperature changes such as those which occur during an nuclear event are compensated for.

Thus, an improved temperature compensation mechanism for an accelerometer utilizing proof masses disposed in a damping fluid has been described. Although a specific embodiment has been illustrated and described, it will be obvious to those skilled in the art that various modifications may be made without departing from the spirit of the invention which is intended to be limited solely by the appended claims.

What is claimed is:

1. In an accelerometer utilizing proof masses disposed in a damping fluid, said proof masses operating against the damping fluid such that when a proof mass is subjected to a G force it causes said fluid to follow a predetermined flow resistance path from below the proof mass to a point above the proof mass, with a bellows and helix arrangement provided to control the length of the flow path with changes in temperature, the area above said bellows being in communication with the point above the proof mass and the area below said bellows being in communication with the area below said proof mass, and the normal flow path being from an area below to an area above said helix, means to prevent a rapid movement of said helix with a sharp temperature change from causing a fluid flow which will affect the position of said proof mass comprising:
    means establishing a low resistance flow path between the area above said helix and the area below said helix.

2. Apparatus according to claim 1 wherein said means establishing a low resistance flow path comprises an internal channel extending from the area above said helix to the area below said helix.

3. Apparatus according to claim 2 and further including separating means separating the area above said helix from the normal flow path associated with said proof mass.

4. In apparatus in which resistance of a flow path is controlled by a helix disposed on a bellows, the normal flow path being from an area below said helix to an area above said helix, expansion and contraction of the bellows changing the path length to compensate for changes in fluid velocity with temperature change, apparatus to prevent rapid movement of the helix and bellows due a rapid temperature change from a affecting flow through the normal flow path, comprising:
    a low resistance flow path extending from the area above the helix to the area below the helix.

5. Apparatus according to claim 4 wherein said low resistance flow path comprises a channel extending from the area above said helix to the area below said helix.

6. Apparatus according to claim 5 and further including separating means separating the area above said helix from the normal flow path so as to leave only small gap between said area above said helix and said normal flow path whereby any rapid movement of said helix will tend to cause fluid to flow through said low resistance flow path rather than through said normal flow path.

* * * * *